United States Patent
Backhaus et al.

(10) Patent No.: US 12,129,028 B2
(45) Date of Patent: Oct. 29, 2024

(54) METHOD AND DEVICE FOR EXPANDING THE FLIGHT ENVELOPE OF A COMMERCIAL AIRCRAFT

(71) Applicant: Deutsches Zentrum für Luft- und Raumfahrt e.V., Bonn (DE)

(72) Inventors: Kai Backhaus, Wolfenbüttel (DE); Jürgen Arnold, Diemarden (DE); Holger Hennings, Rosdorf (DE); Lorenz Tichy, Göttingen (DE)

(73) Assignee: Deutsches Zentrum für Luft- und Raumfahrt e.V., Bonn (DE)

( * ) Notice: Subject to any disclaimer, the term of this patent is extended or adjusted under 35 U.S.C. 154(b) by 55 days.

(21) Appl. No.: 17/742,663

(22) Filed: May 12, 2022

(65) Prior Publication Data
US 2022/0266981 A1 Aug. 25, 2022

Related U.S. Application Data

(63) Continuation of application No. PCT/EP2020/081464, filed on Nov. 9, 2020.

(30) Foreign Application Priority Data
Nov. 13, 2019 (DE) .................. 10 2019 130 597.7

(51) Int. Cl.
*B64C 9/26* (2006.01)
*B64C 13/16* (2006.01)
(Continued)

(52) U.S. Cl.
CPC ............... *B64C 9/26* (2013.01); *B64C 13/16* (2013.01); *B64C 30/00* (2013.01); *B64D 2045/0085* (2013.01)

(58) Field of Classification Search
CPC ..... B64C 9/26; B64C 2003/146; B64C 13/16; B64C 30/00; B64C 3/38; B64C 3/52; B64C 2003/543; B64D 2045/0085
See application file for complete search history.

(56) References Cited

U.S. PATENT DOCUMENTS 3,478,989 A * 11/1969 Ernst-August ............ B64C 5/12
 D12/333
3,734,432 A 5/1973 Low
(Continued)

FOREIGN PATENT DOCUMENTS

| DE | 2214048 A1 | 10/1972 | |
|---|---|---|---|
| EP | 2465770 A2 | 6/2012 | |
| GB | 2136746 A * | 9/1984 | ............. B64C 13/16 |

OTHER PUBLICATIONS

French Search Report in co-pending related French Application No. FR2011664, mailed Mar. 22, 2022.
(Continued)

*Primary Examiner* — Benjamin P Lee
(74) *Attorney, Agent, or Firm* — Thomas | Horstemeyer, LLP

(57) ABSTRACT

In a method of expanding a flight envelope of an aircraft comprising a pair of wing halves and extendable leading-edge flaps at leading wing edges of the wing halves towards higher transonic flight Mach numbers, at least one of the leading-edge flaps at one of the two wing halves is extended in flight direction, when approaching the flight envelope with increasing flight Mach number of the aircraft.

19 Claims, 6 Drawing Sheets

(51) Int. Cl.
*B64C 30/00* (2006.01)
*B64D 45/00* (2006.01)

(56) References Cited

U.S. PATENT DOCUMENTS

| | | | | |
|---|---|---|---|---|
| 4,231,536 A | * | 11/1980 | Ishimitsu | B64D 39/00 244/199.1 |
| 4,358,077 A | * | 11/1982 | Coronel | B64C 3/38 244/46 |
| 4,784,353 A | * | 11/1988 | Sigalla | B64C 5/06 244/91 |
| 5,062,595 A | | 11/1991 | Maxworthy | |
| 6,375,127 B1 | | 4/2002 | Appa | |
| 6,935,592 B2 | * | 8/2005 | Morgenstern | B64C 9/24 244/89 |
| 9,233,755 B1 | * | 1/2016 | Chase | B64C 7/00 |
| 2003/0205640 A1 | | 11/2003 | Bowcutt | |
| 2004/0195464 A1 | | 10/2004 | Vassberg et al. | |
| 2005/0045763 A1 | * | 3/2005 | Morgenstern | B64C 9/24 244/10 |
| 2005/0051666 A1 | * | 3/2005 | Lee | B64C 17/10 244/10 |
| 2005/0103929 A1 | | 5/2005 | Chang et al. | |
| 2005/0116108 A1 | * | 6/2005 | Morgenstern | B64D 27/18 244/130 |
| 2007/0262207 A1 | * | 11/2007 | Morgenstern | B64C 23/04 244/214 |
| 2019/0291846 A1 | | 9/2019 | Harrison et al. | |
| 2019/0300155 A1 | | 10/2019 | Iarocci | |

OTHER PUBLICATIONS

International Preliminary Report on Patentability in related PCT Application No. PCT/EP2020/081464, mailed May 17, 2022.

* cited by examiner

METHOD AND DEVICE FOR EXPANDING THE FLIGHT ENVELOPE OF A COMMERCIAL AIRCRAFT

CROSS REFERENCE TO RELATED APPLICATIONS

This application is a continuation of International Application PCT/EP2020/081464 with an international filing date of Nov. 9, 2020 and claiming priority to co-pending German Patent Application No. DE 10 2019 130 597.7 entitled "Verfahren and Vorrichtung zum Erweitern der Flugenveloppe eines Verkehrsflugzeugs", filed on Nov. 13, 2019.

FIELD OF THE INVENTION

The present invention relates to a method of expanding the flight envelope of an aircraft comprising a pair of wing halves and extendable leading-edge flaps at leading wing edges of the wing halves towards higher transonic flight Mach numbers. Further, the invention relates to a corresponding aircraft comprising a pair of wing halves, extendable leading-edge flaps at leading wing edges of the wing halves and a flight controller configured for operating the extendable leading-edge flaps.

If, in this description, a wing half is mentioned, this may particularly refer to an airfoil of the respective aircraft. However, the Wing half may also be a half of another wing, like, for example, of an elevator of the respective aircraft.

BACKGROUND OF THE INVENTION

Transonically operating aircrafts may only be flown without danger within a defined flight envelope which is composed of different physical limits or boundaries. In the area of flight Mach numbers in the high sub-sonic range, the course of the flight envelope is significantly determined by aeroelastic instabilities. The occurrence of these aeroelastic instabilities at flight Mach numbers in the high sub-sonic range may be explained by compressibility effects at the upper side of the wing halves which arise when the flow approaching the wing halves gets closer to a critical flight Mach number. The critical flight Mach number is that flight Mach number of an undisturbed flow approaching the wing halves at which the local flow over the wing halves reaches the sonic speed for the first time. The critical flight Mach number is significantly dependent on the profile geometry and the wing sweep of the wing halves. At flight Mach numbers above the critical flight Mach number, a transonic flow field comprising a local supersonic flow region arises, often at first at the profile upper side of the wing halves. This supersonic flow region, as a rule, ends with a compression shock extending orthogonally to the surface of the respective wing half, which induces compression waves over the surface of the wing half. These compression waves result in a strong increase of the aerodynamic drag. In addition to the increase of the aerodynamic drag, the compression shock may induce different aeroelastic instabilities, which may particularly be related to a movement of the compression shock with deformation of the respective wing half and to shock-boundary-layer-interactions. These aeroelastic instabilities are the reasons for the phenomenons designated as transonic flutter, buzz and buffet, and may, due to the introduction of energy in form of excited structure vibration, result in damages to or even destruction of the aircraft. The drop of the critical flutter velocity in the transonic area resulting from these instability effects, is also designated as "transonic dip" and defines a maximum allowable flight Mach number or Maximum normal Operation Mach number $M_{MO}$ in the flight envelope.

As a measure to expand the flight envelope of an aircraft, so-called swing wings are known. Depending on their actual embodiment, either the entire airfoil halves or just parts of the airfoil halves are swung to increase the wing sweep of the airfoil halves with higher flight Mach numbers. The mechanical construction of swing wings is very complex. Further, aircrafts with swing wings have a reduced relative payload as compared to aircrafts with fixed wings. Aircrafts with swing wings are nearly always military aircrafts. Even in the military field, large aircrafts with swing wings are rare. One of the rare examples is the Tupolew Tu-160, which, however, has only been built in small numbers.

German patent application publication DE 22 14 048 A and U.S. Pat. No. 3,734,432 belonging to the same patent family disclose an apparatus for flutter suppression, gust elevation and stability augmentation on a vehicle having at least one lift-producing member and moving in a fluid. Instead of suppressing flutter on supersonic transport aircrafts by means of stiffening, a control member is movably attached to each of the leading edge and the trailing edges of said lift-producing member. Sensor means are attached to the lift-producing member for producing signals indicative of the motion of said lift-producing member caused by flutter, gust and vehicle instability. Computer means receive the signals from the sensor means and produce control signals for damping out the motions caused by flutter, gust and vehicle instability. These control signals are provided to drive means moving the control members attached to the leading and trailing edges of said lift-producing member. If the lift-producing member particularly is an airfoil, the control members are hinged leading-edge and trailing-edge flapped controls which are operated in concert to change the lift and pitch moment produced by said airfoil. Such an active system for flutter suppression is highly complex and only provides protection against flutter when operating optimally.

U.S. Pat. No. 6,375,127 B1 discloses an active control system that generates unsteady aerodynamic damping to alleviate aeroelastic structural instability, vibration and dynamic loads. A pair of antagonistically instationary activated actuators is provided, which are controlled by an active control system. Acceleration sensors provide signals to the control system, and the control system generates aerodynamic damping by out-of-phase excitations by means of the actuators. It also applies here that the described system is complex in realization and may only suppress flutter when completely operating optimally.

United States patent application publication US 2005/0045763 A1 discloses an aircraft with devices for reducing the sonic boom in flight with supersonic velocity. The devices comprise strakes coupled to an aircraft fuselage and extending to leading edges of the wings of the aircraft. Leading-edge flaps are coupled to leading edges of the strakes. The leading-edge flaps can be rotated without unsealing the flap from the aircraft fuselage. Further, landing flaps and so-called Krueger flaps are mounted to the leading edge of the wings adjacent to the strakes. A control member is coupled to the leading-edge flaps, the Krueger flaps and the leading-edge flaps of the strakes are configured to adjust the leading-edge surface in an arrangement that tailors aerodynamic flow fields for flight at Mach numbers different from the Mach number to which the aircraft design is optimized. Particularly, the leading-edge surfaces are adjusted to deflect the wing leading edge to reduce lift ahead of spillage at an off-design condition, maintaining a low sonic boom signature.

There still is a need of a method for expanding the flight envelope of an aircraft and a corresponding aircraft which require a considerably reduced effort as compared to both swing wings and active measures for flutter suppression.

SUMMARY OF THE INVENTION

The present invention relates to a method of expanding a flight envelope of an aircraft comprising a pair of wing halves and extendable leading-edge flaps at leading wing edges of the wing halves towards higher transonic flight Mach numbers. The method comprises extending at least one of the leading-edge flaps at one of the two wing halves in flight direction, when approaching the flight envelope with increasing flight Mach number of the aircraft.

The present invention also relates to an aircraft comprising a fuselage, a pair of wing halves mounted to the fuselage, extendable leading-edge flaps at leading wing edges of the wing halves, and a flight controller configured for operating the extendable leading-edge flaps. The flight controller is configured for automatically extending at least one of the leading-edge flaps at one of the two wing halves selectively in flight direction, when a flight envelope of the aircraft is approached with increasing flight Mach number of the aircraft.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
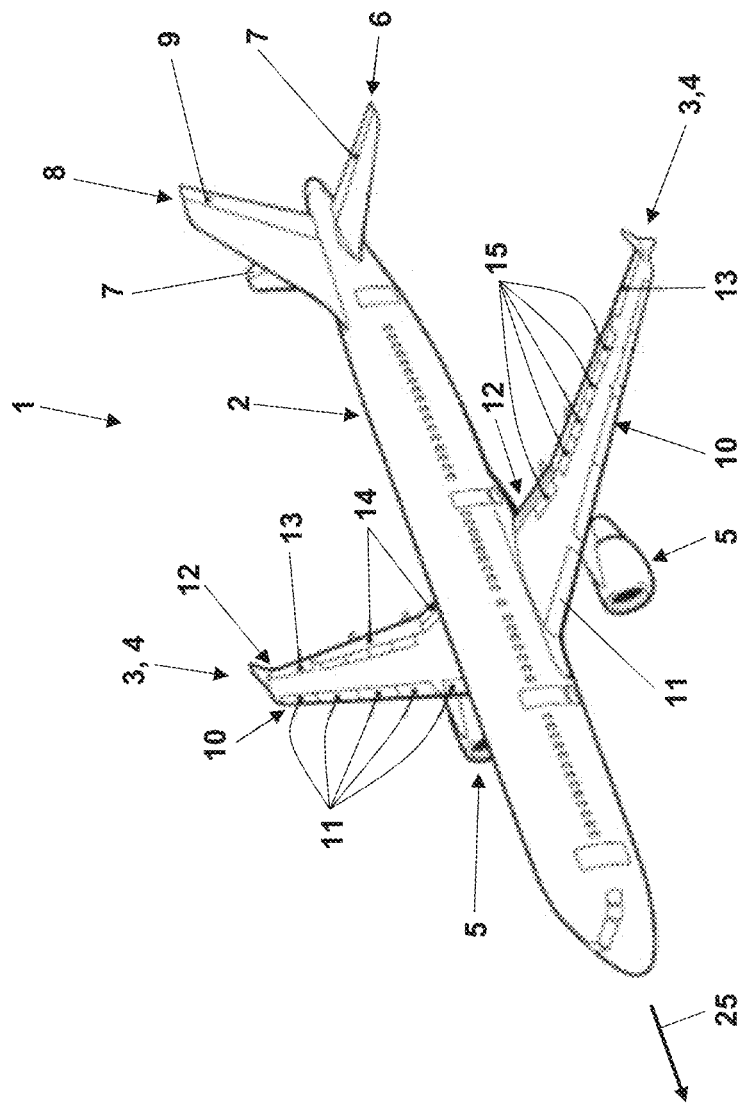
FIG. 1 is a perspective image of a commercial aircraft according to the prior art.

In a method of expanding the flight envelope of an aircraft which comprises a pair of wing halves and expandable leading-edge flaps at the leading edges of the wing halves towards higher transonic flight Mach numbers, at least one of the leading-edge flaps at one of the two wing halves is extended in flight direction, when approaching the flight envelope with increasing flight Mach number of the aircraft.

Thus, at least one leading-edge flap at one of the wing halves which is otherwise extended for increasing a profile camber for increasing the lift at small flight Mach numbers, is only or selectively extended in flight direction. In this way, the shape of the respective wing half is significantly altered in its plane of main extension, but not orthogonally thereto. This alteration results in a variation of the aeroelastic behavior of the wing half. In this way, the flow-structure-coupling which could excite fluttering is disturbed. As a consequence, the so-called transonic dip is reduced or shifted or both reduced and shifted. By means of a reduction or a shift of the transonic dip towards higher transonic flight Mach numbers, the flight envelope of the aircraft is directly expanded. However, a shift of the transonic dip towards smaller flight Mach numbers may also be utilized, because, if the respective aircraft already has a high flight Mach number, such a shift towards smaller flight Mach numbers allows for securely crossing the transonic dip.

The extension of the at least one leading-edge flaps at the at least one of the two wing halves may be realized symmetrically or asymmetrically with respect to a vertical longitudinal center plane of the aircraft. An asymmetric realization may mean that in fact only a single leading-edge flap at one of the two wing halves and no leading-edge flap at the other of the two wing halves is extended. Such an asymmetric intervention may particularly effectively disturb the flow-structure-coupling which is the basis of flutter. On the other hand, symmetric interventions have the advantage to effect the overall flight condition or state of the aircraft to a lesser extent in a way which requires further interventions, particularly a compensating activation of a fin of the aircraft to compensate for the increase of the aerodynamic drag of the one of the wing halves at which the leading-edge flap has been extended in flight direction.

In one embodiment of the method, a leading-edge flap which is arranged in an outer half of a half wing span of the respective wing half is selected for being extended. The outer half of the half wing span of the respective wing half is that part of the wing half further away from the fuselage of the aircraft. The areas of the wing halves primarily subjected to flutter are also located further out in wing span direction, i. e., there where the wing halves are less stiff than further inside. Particularly, the at least one leading-edge flap which is extended may be the most outside leading-edge flap at the respective wing half in wing span direction.

Typically, the at least one leading-edge flap is extended in flight direction at a flight Mach number above 0.5 and below 1. The extension of the at least one leading-edge flap typically increases the aerodynamic drag of the respective wing half considerably so that this measure is only applied if there really is a necessity, i. e., a danger of flutter when approaching the flight envelope with increasing flight Mach number.

Practically, the at least one of the leading-edge flaps may be extended by at least 2% or even by at least 5% of an average profile depth c of the respective flight half in the area of the at least one leading-edge flap when approaching the flight envelope with increasing flight Mach number of the aircraft. An extension by more than 50% of this average profile depth c is not possible with the leading-edge flaps present at the wing halves of current aircraft models. However, such a large extension is also not necessary effectively expanding the flight envelope.

In an embodiment, when approaching the flight envelope with increasing flight Mach number of the aircraft, the at least one of the leading-edge flaps is extended in flight direction at its further outside located outer edge by at least 10%, preferably by at least 20% and even more preferably by at least 30% less than at its further inside located inner edge. In this way, the wing sweep of the wing half is increased, at least in the area of the leading-edge flap extended in flight direction. This increase of wing sweep is achieved without swinging the wing half, but only by extending the at least one leading-edge flap. That the at least one leading-edge flap is extended to a lesser extent at its outer edge located further outside than at its inner edge implies the possibility that it is not linearly extended at all at its outer edge, and at least means a superimposed rotatory or swinging movement about a swing axis running crosswise or normal to a plane of main extension of the respective wing half. Correspondingly, this embodiment may also be described in that the at least one of the leading edge flaps, when approaching the flight envelope with increasing flight Mach number of the aircraft, is extended in flight direction in that it is swung around or swung out about the swing axis running crosswise to the main extension direction of the respective wing half by an angle of at least 1°, preferably of at least 3°, even more preferably of at least 5°. A typical upper limit for the angle by which the leading-edge flap is swung out is about 30°.

In order to pursue the concept of increasing the wing sweep of the respective wing half, at least two of the leading-edge flaps of the respective wing half may be extended when approaching the flight envelope with increasing flight Mach number of the aircraft, wherein the at least two leading-edge flaps may be directly adjacent to one another. It is also possible to extend all the leading-edge flaps at the respective wing half; and preferably, the at least two directly adjacent leading-edge flaps or even all directly adjacent leading-edge flaps which are extended in flight direction are extended in such a way that their flap leading-edges connect to one another continuously. By the entirety of these measures, a leading-edge sweep $\Phi_{VK}$ of the respective wing can be increased by at least 1° or preferably at least 3° or even more preferably at least 5° and typically by at maximum 20°. The fact, that an increase of the wing sweep of a wing half is a suitable measure to enable the wing for higher flight Mach numbers is known. However, the increase of the wing sweep by extending leading-edge flaps at the leading edge in flight direction is not known.

It has already been mentioned, that the leading-edge flaps may be extended asymmetrically, i.e., in an extreme case, only at one of the two wing halves, or symmetrically at both wing halves of the respective pair of wing halves. However, even in an asymmetric implementation, at least one of the leading-edge flaps at each of the two wing halves may be extended in flight direction.

In an aircraft comprising a fuselage, a pair of wing halves attached to the fuselage, extendable leading-edge flaps at leading edges of the wing halves and an open-loop or closed-loop flight controller controlling drives of the leading-edge flaps, the flight controller is configured for automatically carrying out the method described above. Such an aircraft may differ from an aircraft according to the prior art only by a control software implementing this method. However, further modifications may be suitable to, for example, be able to extend the respective leading-edge flap at the wing halves in flight direction at all, and to not compulsorily also lower them, or to not only extend the leading-edge flaps linearly, but to also swing them about a swing axis running crosswise to the direction of main extension of the respective wing half.

The aircraft particularly is an aircraft which comprises at least one of the following features: A wing sweep $\Phi_{0.25c}$ at 25% of the relative profile depth c of the respective wing half is higher than −40° and smaller than 40°. An aspect ratio $\wedge=b^2/S$ of the wing halves is higher than 6, wherein b/2 is a half wing span and S/2 is a wing area of the respective wing half. An aircraft model specific Maximum normal Operation Mach number $M_{MO}$ is between 0.7 and 1.0. These are all features of a commercial or transport aircraft configured for the transonic range of flight Mach numbers.

The aircraft may be an aircraft which additionally comprises devices for actively suppressing flutter of the wing halves. In this case, the flight controller may be configured to execute the present method, if these active devices fail or are insufficient to avoid that the aircraft approaches the flight envelope with increasing flight Mach number. Thus, the present method may particularly be provided as a backup measure for avoiding flutter, as it is typically connected with a considerable increase of aerodynamic drag which is generally not desired in a commercial or transport aircraft. If, however, the danger of flutter can be avoided by means of the present measure, the increased aerodynamic drag and a correspondingly increased fuel consumption are justified.

The flight controller of the aircraft may be configured for recognizing an approach to the flight envelope by comparing present flight parameters of the aircraft with a stored description of the flight envelope. If the flight envelope is defined for the present flight parameters, this is a suitable means for recognizing that the flight envelope is approached. Alternatively or additionally, the flight controller may also be configured for monitoring an approach to the flight envelope by means of evaluating signals of vibration sensors or pressure sensors, particularly pressure sensors which detect instationary pressures. The respective sensors should particularly be suited to temporarily resolve vibrations of the wing halves in a frequency range from 0.5 Hz to 50 Hz and particularly in a frequency range from 1 Hz to 25 Hz. This is the frequency range in which flutter occurs with commercial and transport aircrafts.

Referring now in greater detail to the drawings, the aircraft 1 depicted in FIG. 1 comprises a fuselage 2 and a symmetric pair of airfoil halves 3 or, more generally, of wing halves 4. One engine 5 is mounted to each of the two airfoil halves 3. An elevator unit 6 with elevators 7 and a rudder unit 8 with a rudder 9 are located at a back end of the fuselage 2. Extendable leading-edge flaps 11 are provided at leading edges 10 of the airfoil halves 3. These leading-edge flaps 11 are also designated as slats. At the trailing edges 12 of the airfoil halves, extendable ailerons 13, trailing edge flaps 14 which are also designated as landing flaps and brake flaps 15 located upstream of the trailing edge flaps 14 are mounted.

Figure 2:
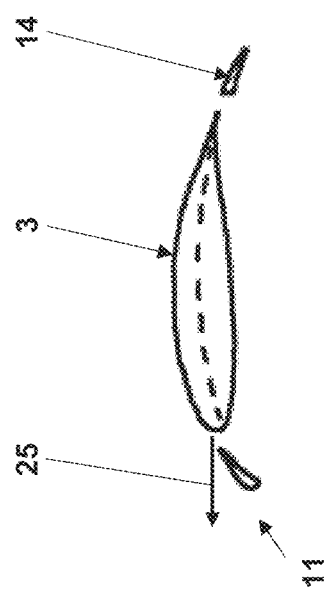
FIG. 2 illustrates increasing the camber of airfoil halves of the aircraft according to FIG. 1 according to the prior art by extending a leading-edge flap at a leading edge and a trailing-edge flap at a trailing edge of the respective airfoil half.

By extending the leading-edge flaps 11 and the trailing-edge flaps 14 in a forward-downward direction and a backward-downward direction, respectively, the profile camber of the respective airfoil half 3 can be increased for low airspeeds of the aircraft 1, as shown in FIG. 2. This configuration of the flaps 11 and 14 is typically selected for increasing the lift during takeoff and landing of the aircraft 1.

Figure 3:
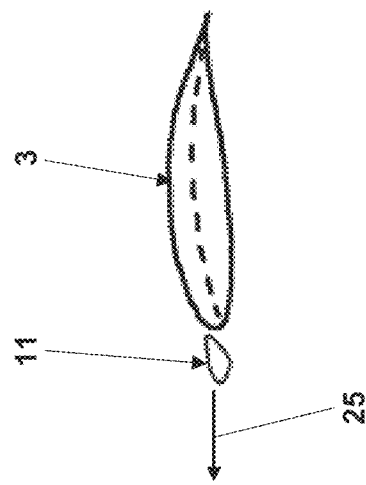
FIG. 3 illustrates extending a leading-edge flap at a leading edge of one of the two airfoil halves of the aircraft according to FIG. 1 in flight direction.

FIG. 3 shows another orientation of the leading-edge flaps 11 with respect to the airfoil halves 3 in which the leading-edge flaps 11 are extended in flight direction 15, i.e. forwards, but without lowering.

Figure 4:
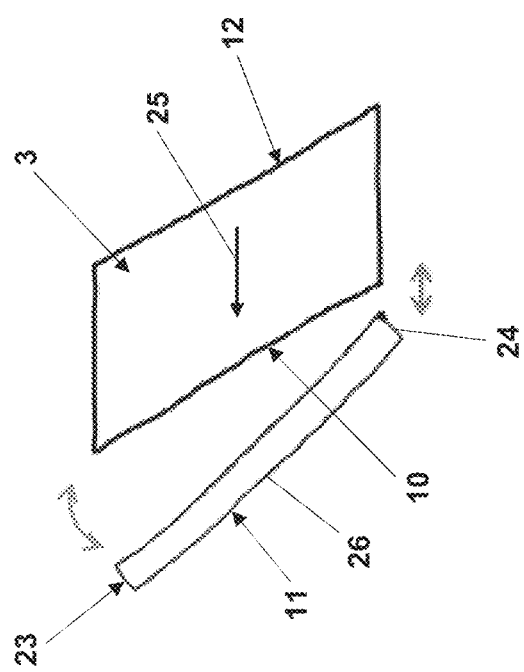
FIG. 4 illustrates swinging-out a leading-edge flap at the leading edge of one of the two airfoil halves of the aircraft according to FIG. 1 in flight direction.

For the airfoil half 3 depicted in the foreground of FIG. 1, FIG. 4 shows that the leading-edge flaps 11 are not only extended with respect to the airfoil half 3, but also swung around a swing axis extending crosswise with respect to a direction of main extension of the airfoil half 3. Thus, the leading-edge flap 11 extends the further away from the leading edge 10 the closer the leading-edge flap 11 is to the fuselage 2 of the aircraft 1. Practically, the leading-edge flap 11, at its inner edge 23 extends further away from the leading edge 10 than at its outer edge 24, and a leading-edge sweep of a flap leading edge 26 of the leading-edge flap 11 is increased as compared to a leading-edge sweep of the leading edge 10.

Figure 5:
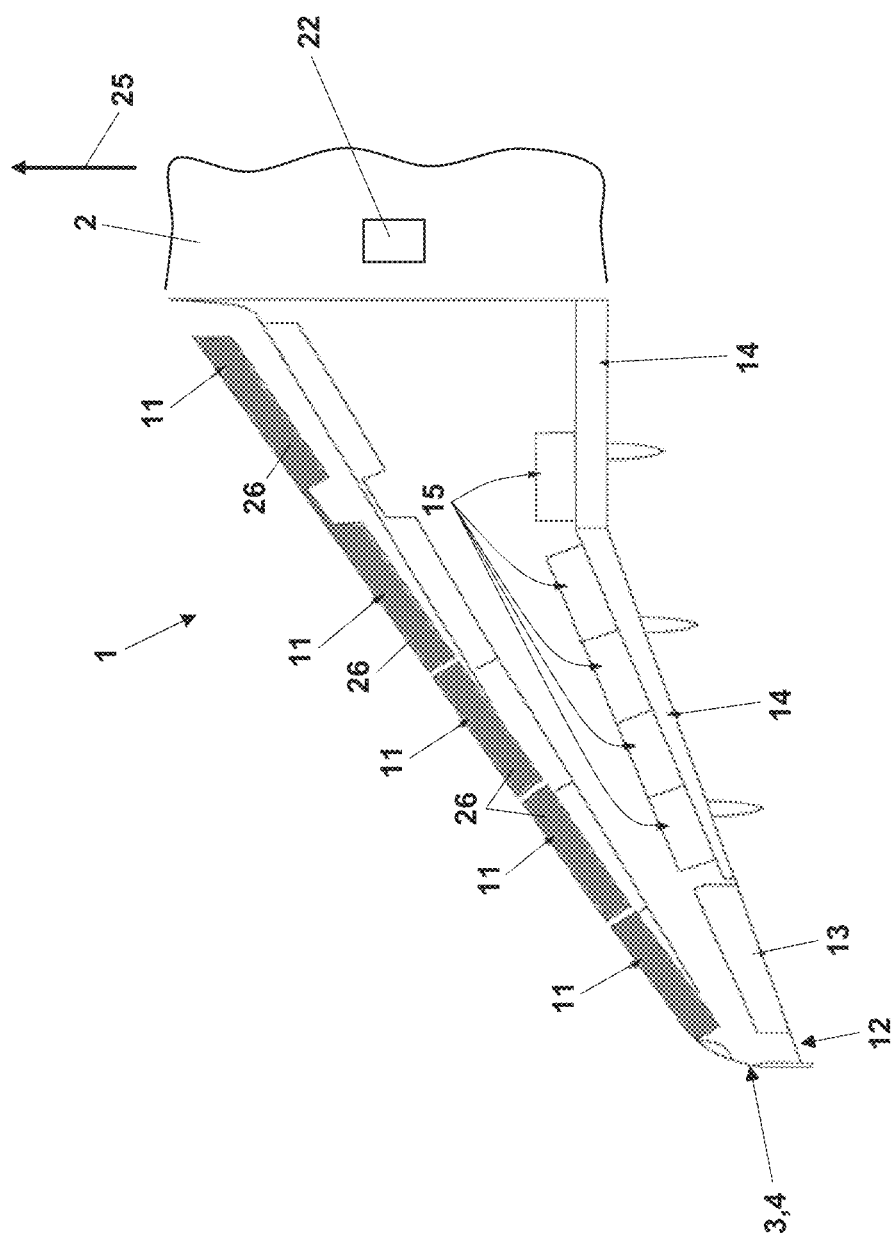
FIG. 5 illustrates the increase of the effective wing sweep of one of the two airfoil halves of the aircraft according to FIG. 1 due to swinging-out the leading-edge flaps at its leading edge in flight direction.

FIG. 5 shows how, by means of extending and swinging all leading-edge flaps 11 at the leading edge 10 of the airfoil 3, the effective wing sweep of the airfoil half 3 as a whole is increased.

Figure 6:
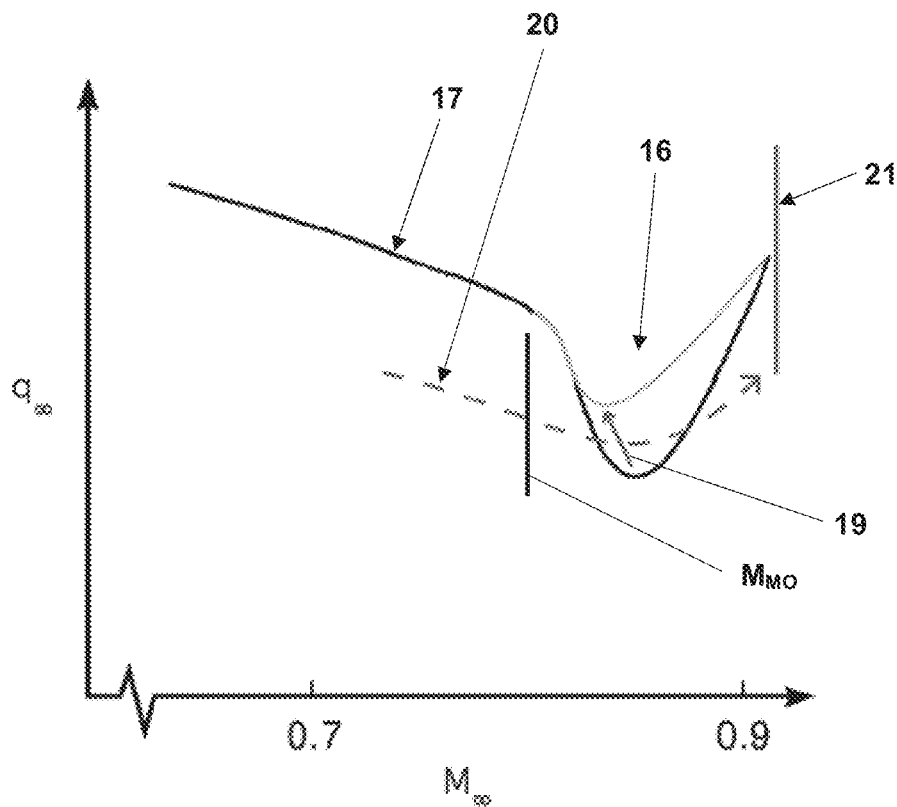
FIG. 6 shows the result of the increase of the effective wing sweep according to FIG. 5 on a so-called transonic dip which determines a maximum allowable flight Mach number or Maximum normal Operation Mach number $M_{MO}$ of the aircraft.

In FIG. 6, a flutter dynamic pressure boundary 17 is plotted over a flight Mach number $M_\infty$ of the aircraft 1. The flutter dynamic pressure boundary 17 indicates the dynamic pressure $q_\infty$ from which on the transonic flutter occurs at a certain flight Mach number $M_\infty$ of the aircraft. Thus, the flutter dynamic pressure boundary 17 delimits a region of stability of the aircraft 1 with regard to the dynamic pressure $q_\infty$ in upward direction. The flutter dynamic pressure boundary 17 is also a measure of a flutter velocity boundary from which on the transonic flutter occurs. With high transonic flight Mach numbers below the sound velocity ($M_\infty=1$), the flutter dynamic pressure boundary 17 displays a so-called transonic dip 16 in which the flutter dynamic pressure boundary 17 transiently decreases. Towards higher flight Mach numbers $M_\infty$, the flutter dynamic pressure boundary 17 increases again. Behind the transonic dip, the region of stability of the aircraft ends at a buffet Mach boundary 21 behind which a buffeting of the wing halves 14 begins. In order to avoid getting close to or even across the flutter dynamic pressure boundary 17 in the area of the transonic dip 16 when increasing the flight Mach number $M_\infty$ of the aircraft at a constant altitude along a curve 20, a Maximum normal Operation Mach number $M_{MO}$ for this altitude is defined at which the so-called transonic flutter does not occur at a sufficient security.

Figure 7:
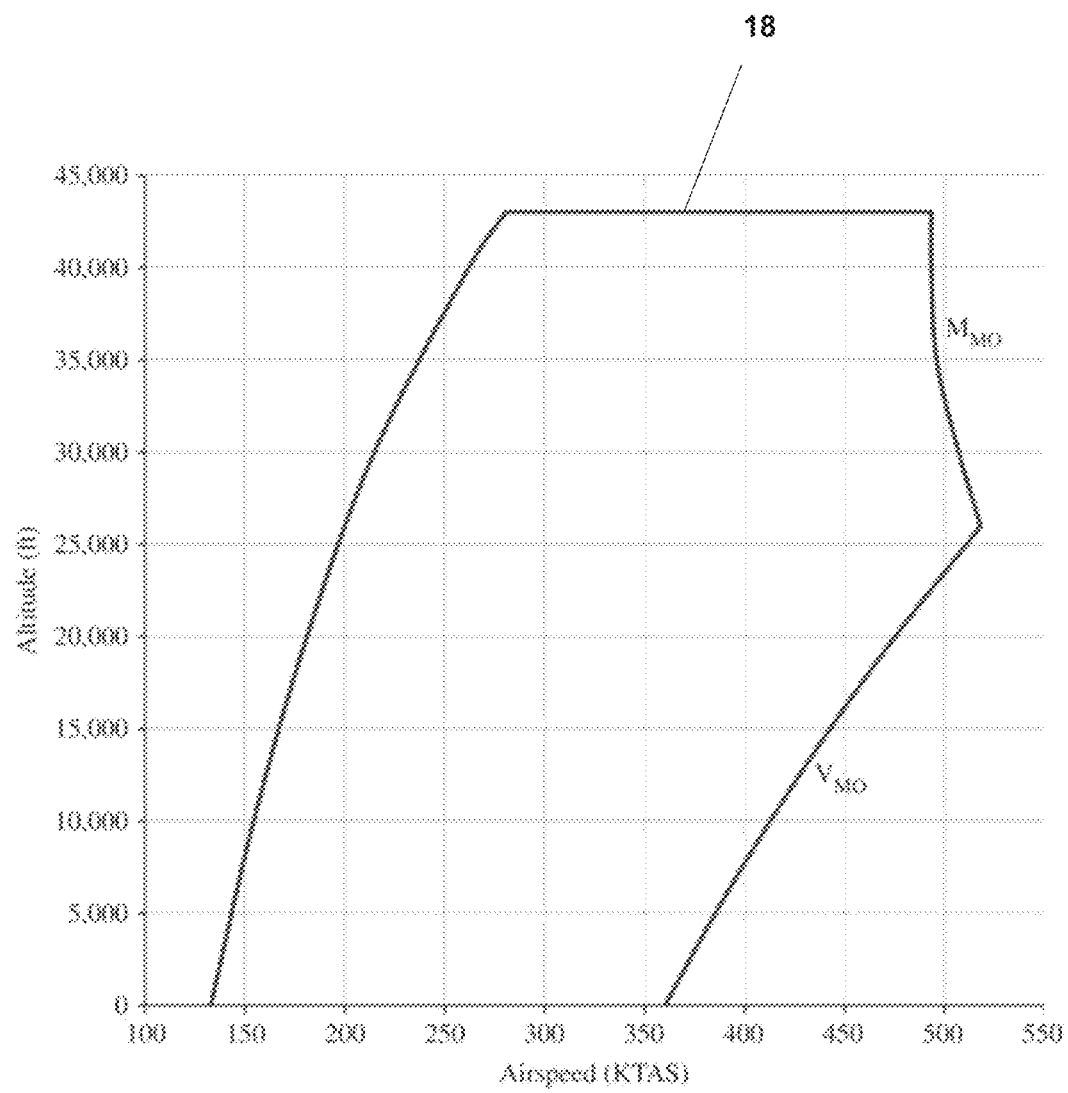
FIG. 7 is a schematic diagram of a flight envelope of the aircraft which, in part, is defined by its Maximum normal Operation Mach number $M_{MO}$.

In FIG. 7, the flight envelope 18 of the transonically operating aircraft 1 is plotted as its maximum altitude in feet over its airspeed in knots. Towards higher airspeeds, the flight envelope 18 at lower altitudes and correspondingly higher air densities is defined by a Maximum normal Operation Velocity $V_{MO}$ and at higher altitudes and correspondingly lower air densities by the Maximum normal Operation Mach number $M_{MO}$.

FIG. 6 illustrates how the increase of the wing sweep shifts the so-called transonic dip 16 of the flutter dynamic pressure boundary 17 in the direction of an arrow 19 so that the transonic dip 16 is clearly flatter and also located at slightly smaller flight Mach numbers $M_\infty$. When the aircraft, along a curve 20 of flight conditions approaches the boundary 17 of the flight envelope 18, the Maximum normal Operation Mach number $M_{MO}$ for the respective altitude can be increased up to the buffet Mach boundary 21, and, thus, the flight envelope 18 can considerably be expanded by increasing the wing sweep of the air foil halves 3 as illustrated in FIG. 5. When, along the curve 20, the area of the original transonic dip 16 has been left again towards higher flight Mach numbers, the wing sweep of the airfoil halves 3 may be reduced again to reduce an associated increase of the aerodynamic drag of the wing halves 4.

The extension of the leading-edge flaps 11 for increasing the wing sweep according to FIG. 3 may automatically be executed by a flight controller 22 according to FIG. 5 which activates the leading-edge flaps 11, the trailing-edge flaps 14 and all other moveable elements 12 and 15 at the airfoil halves 3 by operating associated drives. By lifting the transonic dip 16 according to FIG. 6, particularly the danger of a flutter of the airfoil halves 3 with a further increase of the flight Mach number $M_\infty$ along the curve 20 is removed. The increase of the wing sweep of the airfoil halves 3 according to FIG. 5 is an active but quasi-static measure for avoiding the flutter of the airfoil halves 3 with increasing flight Mach number $M_\infty$. It also belongs to the present disclosure to not extend all, but just a part of the leading-edge flaps 11 with increasing flight Mach number $M_\infty$ in the flight direction 25, and this extension needs not to be symmetric at both airfoil halves 3 and it may even take place at only one of the airfoil halves or in an asymmetric form with respect to both airfoil halves. In this way, the position and the depth of the transonic dip 16 according to FIG. 6 may also be altered such that the curve 20 does not collide with the transonic dip 16.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method of expanding a flight envelope of an aircraft comprising a pair of wing halves and extendable leading-edge flaps at leading wing edges of the wing halves towards higher transonic flight Mach numbers, the method comprising
    extending at least one of the leading-edge flaps at one of the two wing halves in flight direction, when approaching the flight envelope with increasing flight Mach number of the aircraft,
    wherein the aircraft comprises at least one of the following features:
    a wing sweep $\Phi_{0,25c}$ at 25% of the relative profile depth of the respective wing half of more than −40° and of less than 40°,
    an aspect ratio $\wedge=b2/S$ of the wing halves higher than 6, wherein b/2 is a half wing span and S/2 a wing area of the respective wing half, and
    an aircraft model specific Maximum normal Operation Mach number $M_{MO}$ between 0.7 and 1.0.

2. The method of claim 1, wherein the at least one of the leading-edge flaps is extended only in flight direction, when approaching the flight envelope with increasing flight Mach number of the aircraft.

3. The method of claim 1, wherein the at least one of the leading-edge flaps is located in an outer half of a half wing span of the one of the two wing halves when viewing in wing span direction from a fuselage of the aircraft.

4. The method of claim 1, wherein the at least one of the leading-edge flaps is the most outward leading-edge flap in wing span direction when viewing in wing span direction from a fuselage of the aircraft.

5. The method of claim 1, wherein the at least one of the leading-edge flaps is extended at a flight Mach number in a range from 0.5 to 1.0.

6. The method of claim 1, wherein the at least one of the leading-edge flaps is extended by at least 5% of an average profile depth of the respective wing half in the area of the at least one of the leading-edge flaps, when approaching the flight envelope with increasing flight Mach number of the aircraft.

7. The method of claim 1, wherein the at least one of the leading edge- flaps is extended in flight direction at its further outward located outer edge by at least 10% less than at its further inward located inner edge, when approaching the flight envelope with increasing flight Mach number of the aircraft.

8. The method of claim 1, wherein the at least one of the leading-edge flaps, in extending in flight direction, is swung by an angle in a range from 3° to 30° around a swing axis running crosswise with respect to a plane of main extension of the one of the two wing halves, when approaching the flight envelope with increasing flight Mach number of the aircraft.

9. The method of claim 1, wherein at least two of the leading-edge flaps at the one of the two wing halves are extended, when approaching the flight envelope with increasing flight Mach number of the aircraft.

10. The method of claim 9, wherein the at least two of the leading-edge flaps which are extended, when approaching the flight envelope with increasing flight Mach number of the aircraft, are located at the one of the two wing halves directly adjacent to one another.

11. The method of claim 10, wherein all of the leading-edge flaps at the one of the two wing halves are extended in flight direction, when approaching the flight envelope with increasing flight Mach number of the aircraft.

12. The method of claim 10, wherein the at least two directly adjacent leading-edge flaps are extended in such a way that their flap leading edges continuously connect to one another, when approaching the flight envelope with increasing flight Mach number of the aircraft.

13. The method of claim 9, wherein the at least two of the leading-edge flaps are extended, when approaching the flight envelope with increasing flight Mach number of the aircraft, such that a leading-edge sweep $\Phi_{VK}$ of the one of the two wing halves is increased by at least 3°.

14. The method of claim 1, wherein at least one of the leading-edge flaps at each of the two wing halves is extended in flight direction, when approaching the flight envelope with increasing flight Mach number of the aircraft.

15. The method of claim 14, wherein the leading-edge flaps at the two wing halves are symmetrically or asymmetrically extended with respect to a vertical longitudinal center plane of the aircraft, when approaching the flight envelope with increasing flight Mach number of the aircraft.

16. An aircraft comprising
a fuselage,
a pair of wing halves mounted to the fuselage,
extendable leading-edge flaps at leading wing edges of the wing halves,
a flight controller configured for operating the extendable leading-edge flaps,
wherein the flight controller is configured for automatically extending at least one of the leading-edge flaps at one of the two wing halves selectively in flight direction, when a flight envelope of the aircraft is approached with increasing flight Mach number of the aircraft,
wherein the aircraft comprises at least one of the following features:
a wing sweep $\Phi_{0,25c}$ at 25% of the relative profile depth of the respective wing half of more than −40° and of less than 40°,
an aspect ratio $\wedge=b2/S$ of the wing halves higher than 6, wherein b/2 is a half wing span and S/2 a wing area of the respective wing half, and
an aircraft model specific Maximum normal Operation Mach number $M_{MO}$ between 0.7 and 1.0.

17. The aircraft of claim 16, wherein the aircraft comprises devices configured for actively suppressing flutter of the wing halves, wherein the flight controller is configured for extending the at least one leading-edge flap in flight direction then, when devices fail or are insufficient to avoid approaching the flight envelope with increasing flight Mach number of the aircraft.

18. The aircraft of claim 16, wherein the flight controller is configured for recognizing an approach to the flight envelope by means of comparing present flight parameters of the aircraft with a stored description of the flight envelope.

19. The aircraft of claim 16, wherein the flight controller is configured for recognizing an approach to the flight envelope by evaluating signals of at least one of vibration sensors and pressure sensors which sense vibrations of the wing halves in a frequency range from 1 Hz to 25 Hz.

* * * * *